Nov. 29, 1938.  A. HERSHBERGER  2,138,578
METHOD AND APPARATUS FOR THE PRODUCTION OF CELLULOSIC STRUCTURES
Filed Jan. 22, 1936   2 Sheets-Sheet 1

INVENTOR.
Albert Hershberger
BY
Charles F. Daly
ATTORNEYS.

Nov. 29, 1938.   A. HERSHBERGER   2,138,578
METHOD AND APPARATUS FOR THE PRODUCTION OF CELLULOSIC STRUCTURES
Filed Jan. 22, 1936   2 Sheets-Sheet 2

INVENTOR.
Albert Hershberger
BY Charles F. Daley
ATTORNEYS.

Patented Nov. 29, 1938

2,138,578

UNITED STATES PATENT OFFICE 2,138,578

METHOD AND APPARATUS FOR THE PRODUCTION OF CELLULOSIC STRUCTURES

Albert Hershberger, Buffalo, N. Y., assignor, by mesne assignments, to E. I. du Pont de Nemours & Company, Wilmington, Del., a corporation of Delaware Application January 22, 1936, Serial No. 60,281

11 Claims. (Cl. 91—70)

The present invention relates to a method and apparatus for the production of transparent, non-fibrous films and pellicles. More particularly, the invention relates to the production of non-fibrous, coated cellulosic pellicles of glass-clear transparency which are suitable for use as wrapping tissue. The invention will be described with particular reference to the coating of sheets and films of regenerated cellulose, as the preferred embodiment thereof. However, it is to be understood that the principles of the invention are equally applicable to the coating of any transparent, non-fibrous, smooth-surfaced material, such as sheets and films of cellulose derivatives, albuminous material, rubber compounds and derivatives, including sheets and films of cellulose nitrate, cellulose acetate, lowly esterified or lowly etherified cellulose derivatives, gelatin, agar-agar, casein, or the like.

It has been proposed heretofore to coat transparent sheets and films of regenerated cellulose and like materials with various coating compositions for the purpose of transmitting certain desirable characteristics thereto. For example, it has been proposed to coat regenerated cellulose pellicles with various moistureproofing coating compositions containing wax, waxy or wax-like materials as moistureproofing agents, by applying the same thereto from solutions or hot melts to produce a coated sheet which is moistureproof, flexible, water-proof, grease-proof or non-tacky, and preferably transparent.

When certain types of moistureproofing compositions are coated on to regenerated cellulose or other similar transparent films, hazy coatings are obtained. Such a coating may be flexible, moistureproof and possess other desirable characteristics which make the coated sheet suitable for wrapping purposes. The haziness of the coating, however, greatly impairs the attractive appearance of the sheet when compared to a glass-clear transparent film. It also obstructs to some extent a clear vision of the article wrapped in it.

Hazy coatings are at times obtained when certain moistureproofing compositions are coated on to transparent base sheets from solutions. In certain cases, these coatings may be cleared up by altering the solids composition, or by altering the solvent mixture used, or by altering the time and temperature of drying. It is only when these compositions and conditions are properly adjusted that transparent coatings are obtained. When certain desirable moistureproofing compositions are used, however, it is very difficult to obtain the proper adjustment of conditions to produce a coating of glass-clear transparency.

Hazy coatings are also frequently obtained when certain moistureproofing compositions are coated on to a transparent base sheet from a hot melt without the use of any solvent. Such hazy coatings can ordinarily only be cleared up by altering the composition of the hot melt. There are, however, certain cases in which it is undesirable to change the solids composition; for example, in case the coating has an exceptionally strong heat seal or a very good surface slip. In such cases it would be very desirable if the hazy coatings could be cleared up without changing the composition of the coating.

It is therefore an object of the present invention to provide a method for converting the hazy coating of a transparent base into a coating of glass-clear transparency.

It is another object of the present invention to provide a method for producing a pellicle having a coating of glass-clear transparency from a composition which will produce a hazy coating, without changing the composition of the coating.

It is a further object of this invention to provide a method for producing pellicles having coatings of glass-clear transparency without necessitating the accurate control of coating conditions in accordance with previously known coating processes.

It is a still further object of this invention to provide suitable apparatus for carrying out the objects set forth above.

Other objects of the invention will appear hereinafter.

The objects of the invention may be achieved, in general, by coating a transparent base with a composition containing a wax or wax-like moistureproofing agent, removing any excess coating composition from the base, subjecting the coating to vapors of a suitable solvent or solvent mixture, and removing the solvent taken up by the coating.

The invention is particularly applicable to moistureproofing coatings which have been applied to a base from a hot melt. Such moistureproofing coatings generally contain a waxy moistureproofing agent and certain modifying agents which serve to impart various desirable characteristics to the final coating. Modifying agents may be added to a coating composition to impart thereto desirable color, hardness, slip, heat sealing characteristics, etc. The composition may also contain a blending agent which will serve to make the various constituents of the coating composition compatible with each other, and may also function to clear or transparentize the final coating.

As the moistureproofing ingredient in moisture-proofing coating compositions, any wax or wax-like or waxy substance capable of moistureproofing may be used. The paraffins, preferably the high melting point paraffins, such as those melting over 50° C., such as 55° C. and preferably approximately 60° C. or over, are preferred, since they produce coatings which are characterized by very effective moistureproof qualities, improved slip, and freedom from smear when compared with the lower melting paraffins. Some of these high melting paraffins are commercial products. When, however, the still higher melting point paraffins are desired, they may be obtained, for example, from commercial paraffins by suitable treatment. Although the hard and high melting point paraffins are definitely preferred, ceresins and some of the hard, synthetically manufactured waxes, for instance, various derivatives of the Montan waxes or montanic acid, may be used as alternatives. The moistureproofing agents may be used singly or in combination with each other, as may be desired.

As modifying agents, the particular ingredient depends on the desired property in the final coating. Thus, if a hard coating is desired, hard waxes may be used in the composition. As illustrative examples of hard waxes may be mentioned refined carnauba wax, candelilla wax, the Montan waxes or synthetic derivatives of Montan wax, bayberry wax, Brazil wax, apple wax, and the like. Obviously, the hard waxes may be used either singly or mixed with somewhat softer wax. When a mixture of a moistureproofing wax, such as a high melting point paraffin wax and a hard wax, is applied, the balance between the two waxes is determined with reference to their properties. For instance, very high melting paraffin requires less hard wax than does a somewhat lower melting point paraffin. The quantity of paraffin is generally in excess of 30% of the total formula and ordinarily not less than 50% of the total formula. The following illustrative examples set forth certain specific embodiments of this type of composition:

Example I

| | Parts |
|---|---|
| Paraffin (melting point 60° to 61° C.) | 50 |
| Refined carnauba wax | 50 |

Example II

| | Parts |
|---|---|
| Paraffin (melting point 64° C.) | 80 |
| Refined carnauba wax | 20 |

Example III

| | Parts |
|---|---|
| Paraffin (melting point 55° to 57° C.) | 30 |
| Refined carnauba wax | 70 |

Certain resins, both natural and synthetic, also constitute another class of modifying agent which serves to increase the hardness of the coating. Resins also tend to improve the brilliancy and gloss of the coating. In general such a composition of resins constitutes a minor portion of the composition. Obviously, a number of resins can be employed. The resins which are preferred are characterized by complete solubility in hydrocarbons. Other resins such as ester gum, rosin, hydrogenated ester gum, vinyl types of resin which have been so modified as to cause them to be soluble or capable of being dispersed in melted wax, oil-soluble glyptals, more especially the harder varieties, and the chlorinated diphenyl resins illustrate other types of resin which may be used.

Generally, the quantity of resin used will be less than the quantity of the moistureproofing wax. Satisfactory results may be obtained when the resin constitutes from 20 to 30% of the composition. The following is set forth as an illustrative embodiment of this type of composition:

Example IV

| | Parts |
|---|---|
| Paraffin (melting point 60° to 61° C.) | 80 |
| Gum damar (either dewaxed or undewaxed | 20 |

In some cases it is desirable to employ resins in compositions comprising a moistureproofing wax and a hard wax as the hardening agent. In such compositions the resins will also serve as blending agents. When resins of the film-forming type are used, the coating shows an improved water resistance when compared with coatings in which resins such as damar are employed. Also, some of the resins, particularly those of the film-forming type and/or thermoplastic type, also contribute to the heat-sealing properties of the formula. In such formulas the total per cent of resins will generally be less than the total per cent of the hardening wax. In compositions of this type, the resin will not comprise more than 20% of the total solids. Generally, the amount of hard wax will predominate over the amount of resin. As illustrative examples of this type of composition, the following illustrative embodiments are set forth:

Example V

| | Parts |
|---|---|
| Paraffin (melting point 64° C.) | 85 |
| Refined carnauba wax | 10 |
| Ester gum | 5 |

Example VI

| | Parts |
|---|---|
| Paraffin (melting point 60° to 61° C.) | 45 |
| Refined carnauba wax | 45 |
| Gum damar | 10 |

It may, in certain cases, be desirable to use non-resinous blending agents. As examples of non-resinous blending agents may be mentioned hydrogenated castor oil, hydrogenated cocoanut oil, hydrogenated cottonseed oil, stearic acid, anhydrous wool grease, and the like, or such materials as diphenyl or beta-naphthol, where a slight odor is not objectionable, may be used. Non-resinous blending agents are generally used in such quantities as to constitute between 5 and 15% of the coating composition. However, they may constitute as much as 20% of the composition. This type of blending agent is generally used in small quantities to avoid sticky surfaces. As specific examples of this type of composition the following embodiments are set forth:

Example VII

| | Parts |
|---|---|
| Paraffin (melting point 64° C.) | 60 |
| Candelilla wax | 25 |
| Hydrogenated castor oil | 15 |

Example VIII

| | Parts |
|---|---|
| Paraffin (melting point 61° to 62° C.) | 50 |
| Candelilla wax | 40 |
| Diphenyl | 10 |

Still other modifying agents may be employed to impart desirable characteristics to the coating. For example, dyes or pigments may be incorporated in the composition to secure color effects or translucency as would be furnished by certain types of pigment. To improve the surface slip of the coating, small quantities of metallic soap, such as less than 10% of zinc or aluminum stearate, may be used. Small quantities such as 2 to 10% of thermoplastic cellulose derivatives such as ethyl cellulose, benzyl cellulose and cellulose butyrates may be employed to increase the heat sealing effect of the coating.

Optionally, small quantities of softening agents such as mineral oil, high boiling, odorless, organic liquids or low melting solids may be employed.

If desired, small quantities of material such as triethanolamine or triethanolamine soap, which tends to lower the surface tension between the melt and the base may be employed.

The compositions above described may, if desired, contain a minor quantity of a solvent such as a hydrocarbon or chlorinated hydrocarbon. The solvent in such compositions is usually present in an amount not exceeding the total quantity of the solid film-forming ingredient and generally not in excess of 25 to 50% of the total mass, solids and solvents. The use of these solvents does not destroy the character of the mass as a melt. They are used for the purpose of improving the appearance of the final coated sheet, eliminating some of the difficulties encountered during the coating of the sheets and the streaks in the finished product.

The composition may on the other hand be applied from a pure melt in which no solvent is employed or the constituents may be entirely dissolved in a suitable solvent and applied to the transparent base in this form.

The above compositions may be applied to bases in a known manner to produce transparent coatings if the coating conditions are regulated with precision. However, difficulties are sometimes encountered in obtaining glass-clear transparency. These difficulties can often be conveniently overcome by coating a base therewith and immediately thereafter subjecting the coated base to suitable solvent vapors, or sheets which have been previously coated, and due to certain difficulties encountered, are somewhat hazy in appearance, may be subjected to suitable solvent vapors, in accordance with the principles of the present invention, to change the hazy appearance to one of glass-clear transparency.

Solvent vapors with which the hazy coated sheets may be treated to render the same transparent include generally substances which are volatile and which are solvents for the constituents of the coating compositions. As examples of such substances may be mentioned naphtha having a low flash point and naphtha having a high flash point, toluene, xylene, butyl acetate, amyl acetate and chlorinated hydrocarbons. The aromatic hydrocarbons and chlorinated hydrocarbons constitute the preferred species of the present invention. These solvents may be used singly or in combination with each other, depending upon the nature of the constituents of the coating compositions.

Certain other known coating compositions which are adapted to impart very desirable characteristics to coated sheets and films are usually found to produce hazy coatings, especially when applied to the base sheet from a hot melt. Prior to the present invention these coating compositions could not be satisfactorily applied to a base sheet from a hot melt without producing a somewhat hazy appearance. As examples of such compositions the following illustrative embodiments are set forth:

Example IX

| | Parts |
|---|---|
| "Pliolite" or "Plioform" | 27 |
| Paraffin (melting point 62° C.) | 24 |
| Shellac wax | 12 |
| Water white rosin | 37 |

"Pliolite" or "Plioform" above referred to is a resinous material derived from rubber and is described in detail in an article by Thies and Clifford in the "Journal of Industrial and Engineering Chemistry", vol. 26, p. 123 (1934).

Example X

| | Parts |
|---|---|
| Ethyl cellulose | 38 |
| "Cumar P" | 32 |
| "Cumar V" | 18 |
| Montan wax | 9 |
| Benzamide | 3 |

Example XI

| | Parts |
|---|---|
| Ethyl cellulose | 47 |
| "Aroclor 1262" | 39 |
| Gum damar | 7 |
| Paraffin (melting point 62° C.) | 7 |

Example XII

| | Parts |
|---|---|
| Cellulose acetate (56.7% combined acetic acid) | 72 |
| Butyl phthalyl butyl glycollate | 25 |
| Hydrogenated rosin | 2.5 |
| Paraffin (melting point 62° C.) | 0.5 |

The "Cumar P" and "Cumar V" above set forth are para-coumarone-indene resins, having a melting range of 5 to 30° C. and 127 to 142° C. respectively, and are manufactured and sold by The Barrett Company of 40 Rector Street, New York, New York, under the above-designated trade names.

The "Aroclor 1262" above set forth is a low melting point chlorinated diphenyl resin, described in "The Journal of Industrial and Engineering Chemistry" (1930), vol. 22, page 1180, and manufactured and sold under the above designated trade name by the Swann Chemical Company, Graybar Building, New York, New York.

Coatings obtained from the compositions set forth in Examples IX, X and XI, when coated on to transparent regenerated cellulose sheeting from a hot melt, are somewhat hazy, moistureproof, flexible and possess a good slip and a good heat seal. The hazy coated sheets are then passed through the vapors of naphtha having a low flash point, and immediately dried. This treatment results in a glass-clear coating which is moistureproof, flexible and possesses a good slip and a good heat seal. The vapors of solvents other than naphtha having a low flash point may be used. Aromatic hydrocarbons having a boiling point above 100° C. are preferred. For example, toluene, xylene and naphtha having a high flash point may be satisfactorily used, singly or in combination with each other.

As above mentioned, this method may also be used to clear up blushed coatings or hazy films wherein the coatings are applied or cast from solutions and the solvents evaporated therefrom. Example XII illustrates a cellulose acetate composition which, when cast from a solution and dried, yields a hazy film. The hazy sheet, when passed through the vapors of a solvent mixture consisting of 80% ethylene dichloride and 20% anhydrous isopropanol, becomes of satisfactory transparent appearance. Blushed or hazy nitrocellulose coatings may be cleared up by the use of a mixture of solvents consisting of ethyl acetate and toluene.

Although certain specific solvents or solvent mixtures for use in clearing up certain specific coatings are herein set forth, it will be apparent to anyone skilled in the art that various other solvents and solvent mixtures can be used to clear up coatings in accordance with the principles set forth by the present invention.

The details of the present invention will become more clearly apparent by reference to the following description when taken in connection with the accompanying drawings, in which.

Figure 1:
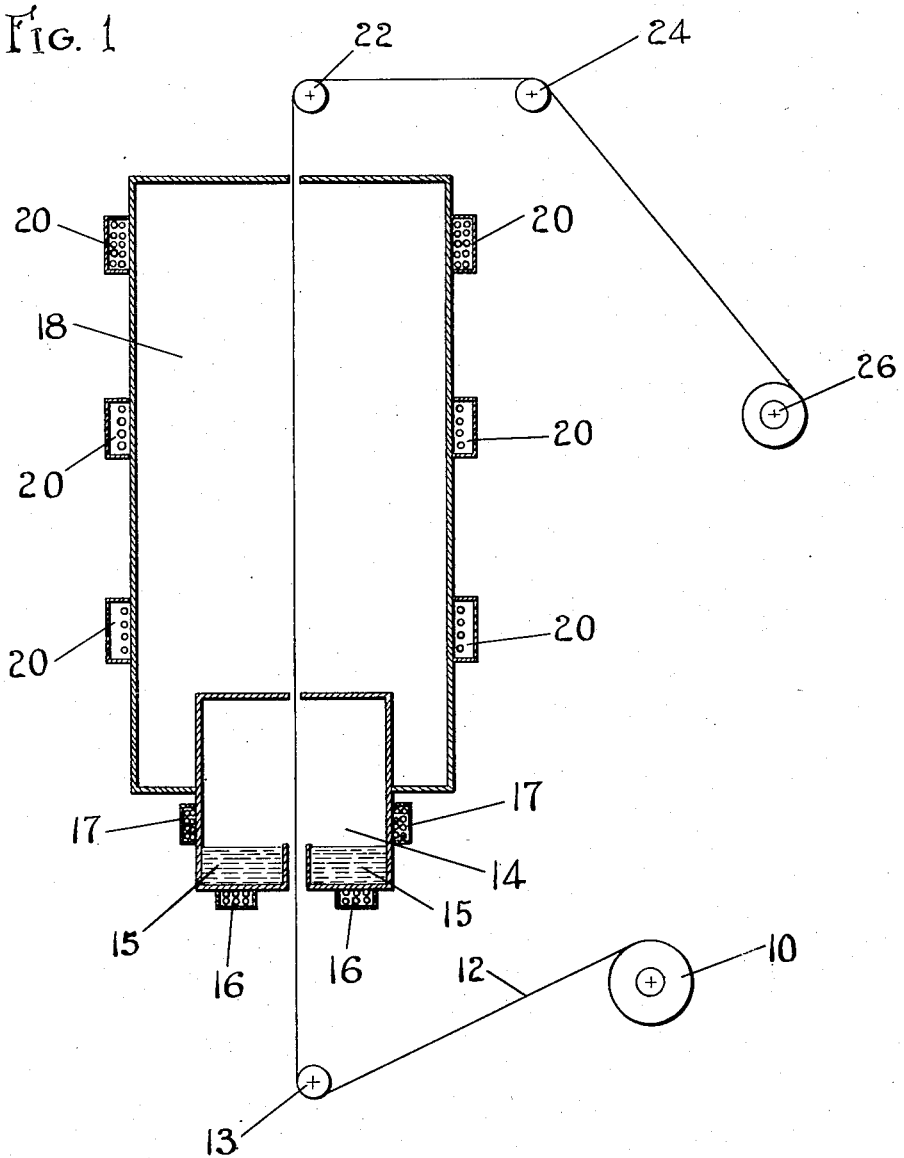
Figure 1 is a diagrammatic illustration of apparatus suitable for use in clearing up the coating of a film to which the coating has previously been applied.

Referring to the drawings, reference numeral 10 designates a supply roll of base material 12 which has been coated with a moistureproofing coating composition and which has taken on a hazy appearance after drying. The film 12 is passed over roll 13 from which it is passed upwardly through chamber 14 which contains a suitable solvent 15 for the coating on the film. The solvent 15 in chamber 14 is volatilized by elevating the temperature thereof in any suitable manner, such as, for example, by means of electrical heating elements 16. When the film passes through chamber 14, the heated solvent vapors attack the coating to at least partially dissolve the same. The exact temperature at which the solvent is maintained in the chamber 14 is determined by the boiling point of the solvent or solvent mixture used. A temperature of from 5° to 10° C. below the boiling point of the solvent is usually sufficient to yield the proper solvent vapor concentration in chamber 14. Chamber 14 is preferably provided with additional heating elements 17 to maintain the chamber at a sufficiently uniform temperature throughout to prevent condensation of vapor on the inner walls of the chamber.

The solvent vapor treated sheet is then conducted through the drying chamber 18 to remove the solvent taken up by the coating. This drying chamber is preferably maintained at a temperature from 70° to 100° C. by any suitable means, such as, for example, by means of an electrical heating unit 20. The dried sheet is then passed over rollers 22 and 24 and is wound up on a wind-up roll 26.

Figure 2:
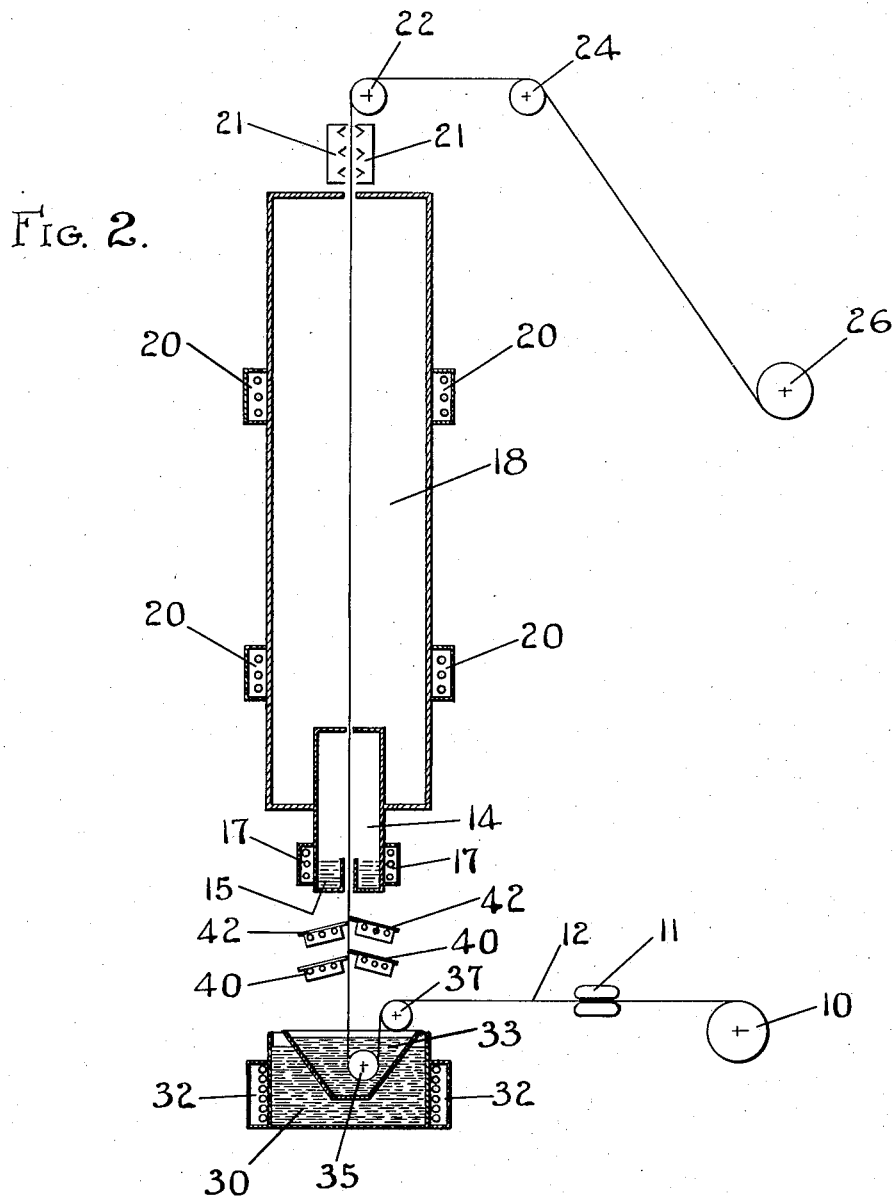
Figure 2 is a diagrammatic illustration showing apparatus suitable for use in coating a film and immediately thereafter subjecting the same to solvent vapor treatment.

In certain cases it is desirable and advantageous to carry out the coating process and the solvent vapor treatment in a single operation. This is particularly true when the coating is applied on to the base sheet from a hot melt without the use of any solvent. Apparatus suitable for use in carrying out this method is illustrated in Figure 2 of the drawings, in which reference numeral 10 designates a supply roll of an uncoated base material. The base material 12 is led from the supply roll 10 through suitable dust and dirt removers or wipers 11; from thence, it is passed through a molten composition 33, by means of guide rollers 35 and 37. The molten coating composition 33 is maintained at the desired temperature by means of an electrically heated oil bath 30. The oil bath 30 may be maintained at a substantially constant temperature by means of electric heating coils 32.

The base sheet 12, after being provided with a suitable coating through immersion in the molten composition 33, is passed vertically upward between one or more sets of doctor knives 40 and 42 which are preferably electrically heated and function to remove any excess composition adhering to the base sheet 12. The doctor knives are preferably maintained at a temperature at least equal to the melting point of the wax in the composition. In addition to serving to remove the excess composition from the base, the knives 40 and 42 also function to smooth and to impart a glossy surface to the coating.

The coated sheet from which all excess of coating composition has been removed by the doctor knives is then passed through solvent vapor chamber 14, and drying chamber 18, in the same manner as above described with reference to Figure 1 of the drawings.

If desired, the apparatus may be provided with a series of nozzles 21, positioned above the drying chamber, through which a suitable drying medium, for example an air blast, may be directed against the film to accelerate the solidification of the coating prior to its engaging the roll 22. In some cases it has been found that a positive cooling of the coated sheet will serve to improve the transparency and/or gloss of the final product.

Since the amount of wax deposited on the sheet is regulated by the contact of the surplus-removing knives 40 and 42, it is advantageous and desirable to regulate the tension on the sheet as it runs through the machine, so that it will be constant at all times. The tension should be such that the base sheet will lie flat and rest uniformly against the doctor knives at all points where they touch it, and with a fairly uniform pressure against the knives. Obviously, this serves to provide a uniform coating and inhibits the depositing of different amounts of composition on various parts of the film.

By regulating the surplus-removing knives and the tension, the thickness of the coating deposited may be varied within wide limits. When the base is formed of a sheet or film of regenerated cellulose having a thickness of 0.0009", satisfactory results are secured if the total thickness of the coating, on both sides, is between 0.00001 and 0.00015", depending on the formula of the composition and the process used. Highly satisfactory results are secured when the total thickness of the coating on both sides is from 0.00003 to 0.00005".

The single step operation illustrated and described with reference to Figure 2 of the drawings is the preferred method of solvent vapor treatment when the latter is applied to hazy coatings which have been applied to the base sheet from a hot melt.

The coated and treated sheets produced by either of the above described processes may be subjected to a humidifying treatment to restore the original moisture and flexibility of the base sheet if necessary or desirable. The coated, treated sheet is then ready to be slit, cut in sheets or the like, to suit the various uses to which it may be put.

In the solvent vapor treatment of coated sheets in accordance with the present invention, it is desirable to subject the coated sheet to the solvent vapor and to the subsequent drying treatment for as short a period of time as possible, consistent with obtaining the desired transparency. Longer treatments than are necessary to obtain the desired results are to be avoided since these longer treatments not only use a greater amount of solvent, but also require a more vigorous drying treatment to remove the solvent therefrom.

The probable explanation for the improvement in transparency in coatings applied to a base sheet from a hot melt by this solvent vapor treatment is as follows: When the coating is applied from a melt, the composition solidifies on the base sheet as a solid mixture instead of a solid solution. The various constituents of the composition are intimately and uniformly mixed with each other in the coating, but some constituent or constituents are present as very fine but discrete particles which cause the coating to be hazy. There is a strong probability that the moistureproofing agent is present in a very finely crystalline form and is largely or entirely responsible for the haze in the coating.

Since the moistureproofing agent, for example paraffin, is the constituent of the composition which is the most soluble in a solvent such as an aromatic hydrocarbon, it will be the last to be redeposited upon evaporation of the solvent. This being the case, a greater amount of paraffin will be deposited on the surface of the coating than throughout the interior of the coating. The paraffin also will tend to be exuded to the surface of the coating due to its incompatibility with the other constituents. The coating after the solvent vapor treatment will then consist of a true solid solution of the various constituents used with an overlying thin layer of paraffin. In this form the coating is transparent.

For the purposes of this specification and claims, I define moistureproof materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98%, and the relative humidity of the atmosphere at the other side being maintained at such a valve as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.25° C.), with a water vapor pressure differential of 50–55 mm. (preferably 53.4 mm. plus or minus 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

Since it is obvious that various changes and modifications may be made in the above description without departing from the nature or spirit thereof, this invention is not to be restricted thereto except as set forth in the appended claims.

I claim:

1. The method for obtaining a transparent moistureproof coating on a non-fibrous pellicle comprising the successive steps of applying to the pellicle a moistureproofing coating containing a moistureproofing agent, removing from said coating any volatile solvent which may be present, removing haze from the coated pellicle by subjecting to the vapor of a solvent for said coating, and removing said solvent vapor from said pellicle, said solvent vapor having a preferential solvent action on said moistureproofing agent.

2. The method for obtaining a transparent moistureproof coating on a non-fibrous pellicle comprising the successive steps of applying to the pellicle a moistureproofing coating containing a moistureproofing agent soluble in aromatic hydrocarbon and chlorinated hydrocarbon solvents, removing from said coating any volatile solvent which may be present, removing haze from the coated pellicle by subjecting to the vapor of a solvent for said coating, and removing said solvent vapor from said pellicle, said solvent vapor taken from the class consisting of aromatic hydrocarbon solvents and chlorinated hydrocarbon solvents.

3. The method for obtaining a transparent moistureproof coating on a non-fibrous pellicle comprising the successive steps of applying to the pellicle a moistureproofing coating containing a moistureproofing agent soluble in aromatic hydrocarbon and chlorinated hydrocarbon solvents, removing from said coating any volatile solvent which may be present, removing haze from the coated pellicle by subjecting to the vapor of a solvent for said coating at an elevated temperature, and removing said solvent vapor from said pellicle, said solvent vapor taken from the group consisting of aromatic hydrocarbon solvents and chlorinated hydrocarbon solvents.

4. The method for obtaining a transparent moistureproof coating on a non-fibrous pellicle comprising the successive steps of applying to the pellicle a moistureproofing coating consisting of a moistureproofing agent or agents and a non-volatile modifying agent or agents, removing haze from the coated pellicle by subjecting to the vapor of a solvent for said coating, and removing said solvent from said pellicle, said solvent having a preferential solvent action on said moistureproofing agent.

5. The method for obtaining a transparent moistureproof coating on a non-fibrous pellicle comprising the successive steps of applying to the pellicle a moistureproofing coating consisting of a moistureproofing agent or agents soluble in aromatic hydrocarbon and chlorinated hydrocarbon solvents and a non-volatile modifying agent or agents, removing haze from the coated pellicle by subjecting to the vapor of a solvent for said coating, and removing said solvent from said pellicle, said solvent taken from the class consisting of aromatic hydrocarbon solvents and chlorinated hydrocarbon solvents.

6. The method for obtaining a transparent moistureproof coating on a non-fibrous pellicle comprising the successive steps of applying to the pellicle a moistureproofing coating consisting of a moistureproofing agent or agents soluble in aromatic hydrocarbon and chlorinated hydrocarbon solvents and a non-volatile modifying agent or agents, removing haze from the coated pellicle by subjecting to the vapor of a solvent for said coating at an elevated temperature, and removing said solvent from said pellicle, said solvent taken from the group consisting of aromatic hydrocarbon solvents and chlorinated hydrocarbon solvents.

7. The method for obtaining a transparent moistureproof coating on a non-fibrous pellicle comprising the successive steps of applying to the pellicle a moistureproofing coating consisting of a moistureproofing agent or agents soluble in aromatic hydrocarbon and chlorinated hydrocarbon solvents, and a non-volatile modifying agent or agents, removing haze from the coated pellicle by subjecting to the vapor of a solvent for said coating at a temperature below the boiling point of said solvent, and removing said solvent from said pellicle, said solvent taken from the group consisting of aromatic hydrocarbon solvents and chlorinated hydrocarbon solvents.

8. The method for obtaining a transparent moistureproof coating on a non-fibrous pellicle comprising the successive steps of applying to the pellicle a moistureproofing coating consisting of a moistureproofing agent or agents soluble in aromatic hydrocarbon and chlorinated hydrocarbon solvents, and a non-volatile modifying agent or agents, removing haze from the coated pellicle by subjecting to the vapor of a solvent for said coating at a temperature from 5° to 10° C. below the boiling point of said solvent, and removing said solvent from said pellicle, said solvent taken from the group consisting of aromatic hydrocarbon solvents and chlorinated hydrocarbon solvents.

9. The method for obtaining a transparent moistureproof coating on a non-fibrous pellicle comprising the successive steps of applying to the pellicle a moistureproofing coating consisting of a moistureproofing agent or agents soluble in aromatic hydrocarbon and chlorinated hydrocarbon solvents, and a non-volatile modifying agent or agents, removing any excess coating from said pellicle, removing haze from the coated pellicle by subjecting to the vapor of a solvent for said coating at an elevated temperature, and removing said solvent from said pellicle, said solvent taken from the group consisting of aromatic hydrocarbon solvents and chlorinated hydrocarbon solvents.

10. In a method for removing haze from the moistureproofing coating on a non-fibrous pellicle the steps which comprise passing a pellicle coated with a composition consisting of a moistureproofing agent or agents and a non-volatile modifying agent or agents through the vapor of a solvent for the coating, said solvent having a preferential solvent action on said moistureproofing agent, until said coating has at least partially dissolved, and removing the solvent from said coating.

11. In a method for removing haze from the moistureproofing coating on a non-fibrous pellicle the steps which comprise passing a pellicle coated with a composition consisting of a moistureproofing agent or agents and a non-volatile modifying agent or agents through the vapor of a solvent for the coating, said solvent having a preferential solvent action on said moistureproofing agent, at a temperature below the boiling point of said solvent until said coating has at least partially dissolved, and removing the solvent from said coating.

ALBERT HERSHBERGER.